US011386494B2

(12) United States Patent
Moon (10) Patent No.: US 11,386,494 B2
(45) Date of Patent: Jul. 12, 2022

(54) CRYPTOCURRENCY TRADING METHOD AND SYSTEM

(71) Applicant: COINONE INC., Seoul (KR)

(72) Inventor: Daekyeong Moon, Seoul (KR)

(73) Assignee: COINONE INC., Seoul (KR)

( * ) Notice: Subject to any disclaimer, the term of this patent is extended or adjusted under 35 U.S.C. 154(b) by 0 days.

(21) Appl. No.: 16/564,088

(22) Filed: Sep. 9, 2019

(65) Prior Publication Data

US 2020/0090271 A1    Mar. 19, 2020

(30) Foreign Application Priority Data

Sep. 19, 2018 (KR) .................. 10-2018-0112391
Oct. 18, 2018 (KR) .................. 10-2018-0124730

(51) Int. Cl.
*G06Q 40/04* (2012.01)
(52) U.S. Cl.
CPC ......... *G06Q 40/04* (2013.01); *G06Q 2220/00* (2013.01)
(58) Field of Classification Search
CPC ........................ G06Q 40/04; G06Q 2220/00
USPC ................................................... 705/44
See application file for complete search history.

(56) References Cited

U.S. PATENT DOCUMENTS 10,102,265 B1 * 10/2018 Madisetti ............ G06F 16/1805
10,346,775 B1 *  7/2019 Xu .................. G06Q 10/06315

| 2008/0059846 | A1 * | 3/2008 | Rosenthal | G06Q 40/04 |
| | | | | 714/E11.002 |
| 2010/0017647 | A1 * | 1/2010 | Callaway | G06Q 40/04 |
| | | | | 714/48 |
| 2013/0080312 | A1 * | 3/2013 | Kawamura | G06Q 40/06 |
| | | | | 705/37 |

(Continued)

FOREIGN PATENT DOCUMENTS

| JP | 2001-043105 A | 2/2001 |
| JP | 2002-230294 A | 8/2002 |

(Continued)

OTHER PUBLICATIONS

Title: Application of Blockchain in Booking and Registration Systems of Securities Exchanges Authors: Mahdi H. Miraz, et al. Date: Aug. 2018 Publiched: IEEE International Conference on Computing, Electronics & Communications Engineering 2018 (Year: 2018).*

(Continued)

*Primary Examiner* — Christopher Bridges
*Assistant Examiner* — Yongsik Park
(74) *Attorney, Agent, or Firm* — Korus Patent, LLC; Seong Il Jeong (57) ABSTRACT

Disclosed herein are a cryptocurrency trading system and method. The cryptocurrency trading system includes: a first matching server configured to generate a transaction pair by matching an order requesting a cryptocurrency transaction with another order to be concluded in conjunction with the former order in order to process the former order; and a coordination device configured to add the first matching server to the cryptocurrency trading system. When the first matching server fails, the coordination device registers a second matching server and allows the second matching server to process the former order.

10 Claims, 6 Drawing Sheets

(56) References Cited

U.S. PATENT DOCUMENTS

| | | | |
|---|---|---|---|
| 2014/0279350 A1* | 9/2014 | Petersen | G06Q 40/04 |
| | | | 705/37 |
| 2016/0071096 A1* | 3/2016 | Rosca | G06Q 20/36 |
| | | | 705/67 |
| 2017/0123929 A1* | 5/2017 | Helleren | G06F 11/1441 |
| 2018/0247191 A1* | 8/2018 | Katz | G06V 40/16 |
| 2019/0020716 A1* | 1/2019 | Fukuchi | G06F 11/2025 |

FOREIGN PATENT DOCUMENTS

| | | |
|---|---|---|
| JP | 2009-009286 A | 1/2009 |
| JP | 2013-506892 A | 2/2013 |
| JP | 2017-152047 A | 8/2017 |

OTHER PUBLICATIONS

Cosmin Harangus, How to Build a Crypto Trading Platform #1: Ethereum Wallet, URL: https://around25.com/blog/building-a-crypto-trading-platform-ethereum-wallet/, May 31, 2018, around 25 homepage.

Cosmin Harangus, Building a Crypto Trading Platform | The Trading Engine, URL: https://web.archive.org/web/20180711142748/https://around25.com/blog/building-a-trading-engine-for-a-crypto-exchage/, Jul. 11, 2018, around 25 homepage.

Anonymous, Kafka Architecture, URL: http://cloudurable.com/blog/kafka-architecture/index.html, May 11, 2017, Cloudurable homepage.

Anonymous, zookeeper master slave example, URL: https://github.com/wbj0110/zookeeper-master-slave-example, May 20, 2016, GitHub homepage.

* cited by examiner

CRYPTOCURRENCY TRADING METHOD AND SYSTEM

CROSS-REFERENCE TO RELATED APPLICATION

This application claims the benefit of Korean Patent Applications No. 10-2018-0112391 filed on 19 Sep. 2018 and No. 10-2018-0124730 filed on 18 Oct. 2018 which are hereby incorporated by reference herein in its entirety.

BACKGROUND

1. Technical Field

Embodiments disclosed herein relate to a cryptocurrency trading method and system, and more specifically to a cryptocurrency trading method and system which can flexibly deal with failures in connection with cryptocurrency transactions which need to be sequentially concluded, thereby enabling cryptocurrency transactions to be securely concluded.

2. Description of the Related Art

In recent years, as cryptocurrencies, such as Bitcoin and Ethereum, have credits and values as money, the transactions thereof have become active. For example, cryptocurrency can be bought with real money, and real money can be bought with cryptocurrency. In addition, cryptocurrencies have their own values and, thus, may be exchanged for other cryptocurrencies.

As the trading of cryptocurrencies becomes active, the needs for a system to rapidly process transactions while securely trading cryptocurrencies are increasing. Furthermore, since the amount of cryptocurrency is flexible, there is a need for a system that can flexibly deal with an increase even when the number of requests for the trading of the cryptocurrency increases suddenly. In contrast, current systems for brokering the trading of cryptocurrencies merely carry out transactions, and do not provide sufficient measures when it is necessary to rapidly conclude transactions or do not provide sufficient countermeasures when a failure occurs in the system.

In connection with this, Korean Patent Application Publication No. 10-2018-0107037 discloses a payment system in which a buyer can exchange cryptocurrency for cash in accordance with the price of cryptocurrency and use the cash and a seller can request a payment in the same manner as in typical payment and receive the payment in cash or cryptocurrency. However, this payment system does not meet the needs described above.

Therefore, there is a demand for technology which is capable of meeting the needs described above.

Meanwhile, the above-described background technology corresponds to technical information that has been possessed by the present inventor in order to contrive the present invention or which has been acquired in the process of contriving the present invention, and can not necessarily be regarded as well-known technology which had been known to the public prior to the filing of the present invention.

SUMMARY

Embodiments disclosed herein are intended to propose a cryptocurrency trading system and method.

Embodiments disclosed herein are intended to propose a cryptocurrency trading system and method which can increase the number of orders which can be processed per second, thereby efficiently processing orders.

Embodiments disclosed herein are intended to propose a cryptocurrency trading system and method which can easily expand cryptocurrency trading service.

Embodiments disclosed herein are intended to propose a cryptocurrency trading system and method which can actively deal with failures which may occur in the trading system.

Embodiments disclosed herein are intended to propose a cryptocurrency trading system and method which can minimize the load which is imposed on a database.

Embodiments disclosed herein are intended to propose a cryptocurrency trading system and method which enable user data to be securely used.

As a technical solution for achieving at least one of the above objects, according to one embodiment, there is provided a cryptocurrency trading system including: a first matching server configured to generate a transaction pair by matching an order requesting a cryptocurrency transaction with another order to be concluded in conjunction with the former order in order to process the former order; and a coordination device configured to add the first matching server to the cryptocurrency trading system; wherein when the first matching server fails, the coordination device registers a second matching server and allows the second matching server to process the former order.

According to another embodiment, there is provided a cryptocurrency trading method by which a cryptocurrency trading system, including a first matching server configured to generate a transaction pair by matching an order requesting a cryptocurrency transaction with another order to be concluded in conjunction with the former order in order to process the former order, trades cryptocurrency, the cryptocurrency trading method including: when the first matching server fails, registering a second matching server and allowing the second matching server to process the former order.

According to still another embodiment, there is provided a computer-readable storage medium having stored thereon a program which performs a cryptocurrency trading method, the cryptocurrency trading method including, when the first matching server fails, registering a second matching server and allowing the second matching server to process the former order.

According to still another embodiment, there is provided a computer program which is executed by a cryptocurrency trading system and which is stored in a storage medium to perform a cryptocurrency trading method, the cryptocurrency trading method including, when the first matching server fails, registering a second matching server and allowing the second matching server to process the former order.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Various embodiments will be described in detail below with reference to the accompanying drawings. The following embodiments may be modified to various different forms and then practiced. In order to more clearly illustrate the features of the embodiments, detailed descriptions of items which are well known to those having ordinary skill in the art to the following embodiments pertain will be omitted. In the drawings, portions unrelated to the following description will be omitted. Throughout the specification, similar reference symbols will be assigned to similar portions.

Throughout the specification and the claims, when one component is described as being "connected" to another component, the one component may be "directly connected" to the other component or "electrically connected" to the other component through a third component. Furthermore, when any portion is described as including any component, this does not mean that the portion does not exclude another component but means that the portion may further include another component, unless explicitly described to the contrary.

The embodiments of the present invention will be described in detail below with reference to the accompanying drawings.

Figure 1:
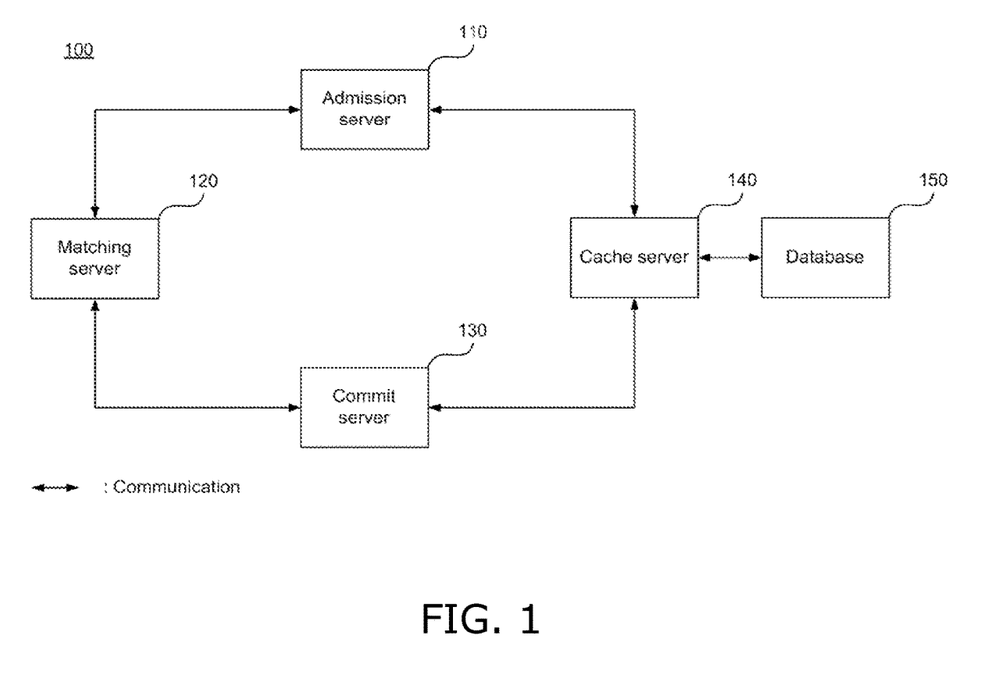
FIGS. 1 to 3 are diagrams showing the configurations of cryptocurrency trading systems according to embodiments.
Figure 2:
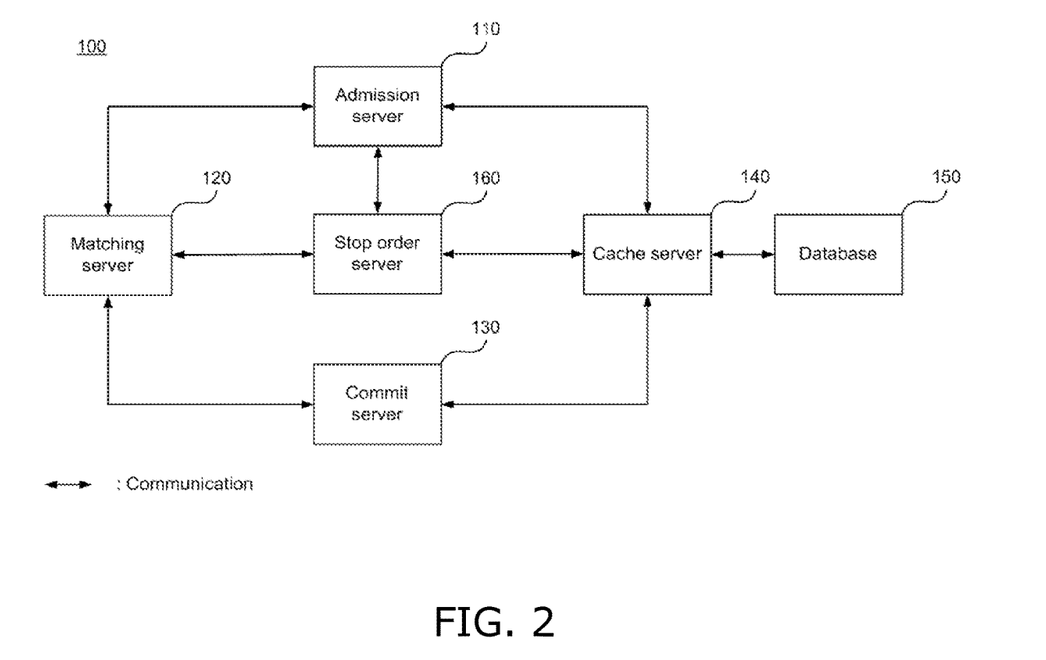
Figure 3:
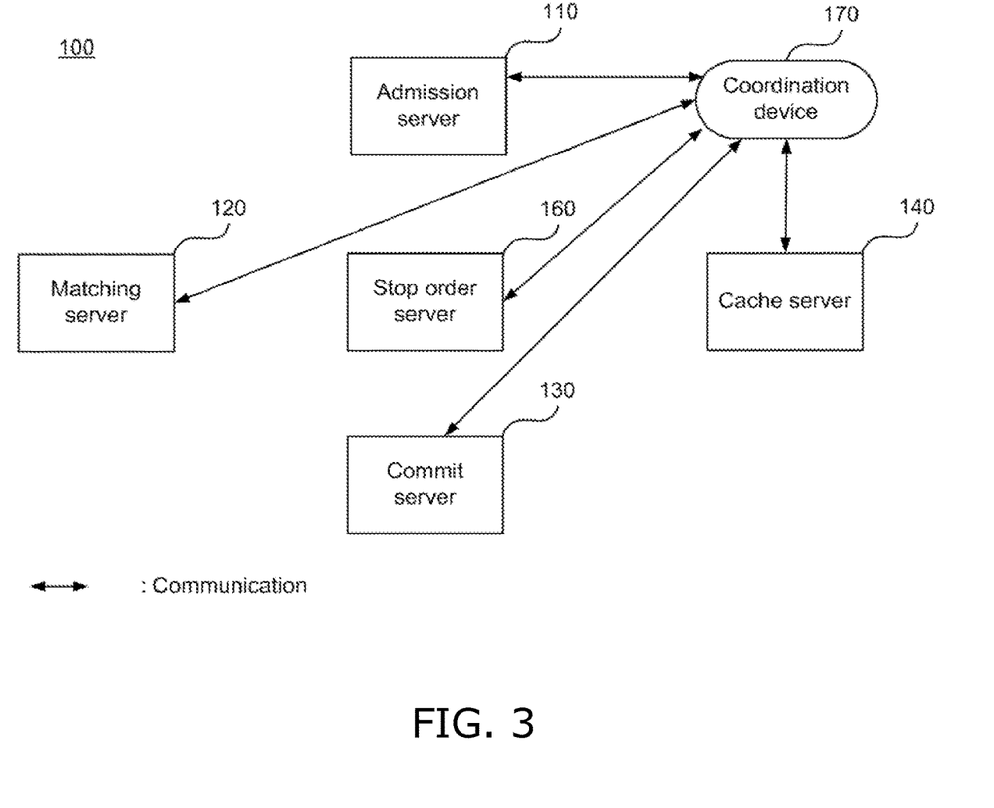

FIGS. 1 to 3 are diagrams showing the configurations of cryptocurrency trading systems according to embodiments.

In connection with this, the term "cryptocurrency" refers to a type of electronic money which remains in the form of information on a computer or the like and is traded in cyberspace without a real thing. Cryptocurrency is also referred to as virtual currency.

When receiving a request for a transaction of cryptocurrency (for example, a sale of cryptocurrency, a purchase of cryptocurrency, or the like) from a user, the cryptocurrency trading system (for ease of description, hereinafter referred to as the "trading system") 100 recognizes the transaction as an order, and processes the order, thereby concluding the transaction.

Referring to FIG. 1, a trading system 100 according to one embodiment includes a matching server 120.

Furthermore, the trading system 100 according to the embodiment may include an admission server 110, a commit server 130, a cache server 140, and a database 150.

The admission server 110 according to one embodiment receives a user's request to sell or buy cryptocurrency from an external system (not shown) present outside the trading system 100 while communicating with the external system.

The admission server 110 may process the sell or buy request, received from the external system, as an "order." For example, the admission server 110 may acquire an order requesting to buy one bitcoin at a price of 100 won. In this case, the order has an identifier (ID) which enables the order to be distinguished from other orders. An ID enables a corresponding order to be uniquely identified.

In this case, the admission server 110 may identify the type of order. Orders may include, e.g., a "designated price transaction" which allows a purchase or sale only at a designated price, a "market price transaction" which allows a purchase or sale at a price applied in the market when a request is made, and a "stop transaction" which allows a purchase or sale only when or until a specific condition is satisfied. The admission server 110 may identify the type of order, and may allow at least part of the requested order to be concluded.

The admission server 110 may identify the type of acquired order, and may transfer the order to the matching server 120 when it is determined that the order is a "designated price transaction" or a "market price transaction." Furthermore, when it is determined that the order is a "stop transaction," the admission server 110 may transfer the order to a stop order server 160 which will be described later. In this case, the "stop transaction" may be reacquired as a "designated price transaction" or a "market price transaction" via the stop order server 160, and the admission server 110 may transfer the reacquired order to the matching server 120.

When acquiring the order, the admission server 110 may acquire user data by requesting the user data from the cache server 140.

In this case, the term "user data" refers to information required for the transaction of cryptocurrency, and includes various types of information about a user. For example, the user data may include information about the bank balance of a user. Furthermore, for example, the user data may include an order book which records a requested order or records the deletion of an order attributable to the completion of the processing of the order.

According to an embodiment for acquiring user data, the admission server 110 may request a lease from the cache server 140 for the user data, but the method for acquiring user data is limited to the above-described example. For example, the admission server 110 may make a lock request for user data.

The admission server 110 which has acquired the user data may check whether a user who requested the order has a balance for the processing of the order by referring to the user data.

Furthermore, when it is determined that the user has a balance, the admission server 110 may also transmit information about the order while returning the data, the lease of which has been requested, to the cache server 140. The cache server 140, which will be described in detail below, may record the order in the user's order book stored in the database 150 while acquiring the order information. Furthermore, the admission server 110 may also transmit its ID (e.g., a server ID) while transmitting the order information to the cache server 140 so that the ID of the server can be stored in the database 150.

In addition, the admission server 110 may transmit a result value regarding the order to the external system.

Furthermore, the admission server 110 may queue the order into the matching server 120.

The above-described admission server 110 may be implemented as one or more instances, and may scale out while increasing instances.

The matching server 120 according to one embodiment may generate a transaction pair by matching queued orders with each other.

In other words, the matching server 120 may acquire orders from the admission server 110, and, when it is determined by matching the acquired orders with each other that a transaction can be concluded, may transfer a pair of available orders to the commit server 130 as a transaction pair. The commit server 130, which will be described later, may record information about the transaction pair in the database 150. Through this, the matching server 120 does not need to access the database 150 to process the transaction pair to be directly concluded, which minimizes an I/O bottleneck which may occur in the matching server 120.

When the matching server 120 generates the transaction pair, it may delete the orders included in the transaction pair from a queue.

Furthermore, the matching server 120 may transfer conclusion information, i.e., information about the conclusion of a transaction pair, to the stop order server 160. In this case, the conclusion information may be received from the commit server 130, and the commit server 130 may transfer the conclusion information to the matching server 120 in response to a conclusion request transferred from the matching server 120.

Meanwhile, the matching server 120 may detect the occurrence of a failure in the admission server 110, and, when it is determined that a failure has occurred in the admission server 110, may queue an order unknown to the matching server 120 among orders having the server ID of the admission server 110 in the order book of the database 150 in order to process the order as if the admission server 110 transferred it.

Furthermore, the matching server 120 may detect the occurrence of a failure in the commit server 130, and, when it is determined that a failure has occurred in the commit server 130, may determine whether the processing of orders, acknowledgements of which have not been received from the commit server 130, has been completed on the database 150 by referring to the order book and the transaction history on the database 150 and may request the processing of the orders from another commit server when the processing of the orders has been not completed.

The above-described matching server 120 may be implemented as one or more instances. One of the one or more instances may be selected as a master, and may be allowed to receive orders from the admission server 110 in its queue and to process the orders while communicating with the commit server 130.

In this case, when there is a plurality of instances, the plurality of instances may be installed in respective physically separate servers, or may be installed in a single physical server. Accordingly, when an instance is selected as a master instance, a physical server corresponding to the instance operates as the matching server. The physical server may be different from or the same as a server in which a failure occurs. Preferably, in order to flexibly respond to a failure, instances may be located on different physical servers.

Meanwhile, instances other than the instance selected as the master may be set as slaves. When the master instance fails and cannot operate as the matching server 120, one of the slave instances may become the master instance. When the fact that transactions are sequentially concluded due to the characteristics of cryptocurrency transactions is taken into consideration, only a single matching server needs to operate. However, in order to deal with a failure which may occur in the matching server, only one of a plurality of instances may operate as the matching server.

In this case, methods of selecting a master instance from among one or more instances may be various.

According to an embodiment, a slave instance randomly selected from among slave instances may become a master instance.

According to another embodiment, a slave instance registered as the matching server first among the slave instances may become a master instance.

In connection with this, as shown in FIG. 3, the trading system 100 may further include a coordination device 170. The coordination device 170 provides at least one of a distributed configuration service, a synchronization service, and a naming registry, and performs the sharing of information between servers constituting the trading system, the status check of the servers, or synchronization between the servers. Accordingly, the coordination device 170 may detect a server to be newly registered in the system, and the coordination device 170 may register the server. The coordination device 170 may be implemented as, e.g., an apache zookeeper, or may be implemented as any solution replaceable with the apache zookeeper.

Accordingly, for example, an instance registered as the matching server with the coordination device 170 among slave instances may become a master instance.

When the master instance is changed according to the example described above, the matching server, which newly becomes a master, may request the commit server 130 to conclude a transaction pair and respond if there is the transaction pair that has been received from a previous master instance but has not been concluded. In response to the request, the commit server 130 may conclude a non-concluded transaction pair and may respond to the new master instance. Thereafter, the new master instance may recover one or more orders not processed by the previous master by referring to the orders recorded in the order book on the database 150. During the recovery, the new master instance may receive a new order from the admission server 110. The new order may be pending, and may be queued when the new order does not overlap the recovered orders after the recovery of the orders not processed has been completed.

Meanwhile, the commit server 130 according to an embodiment concludes a transaction pair acquired from the matching server 120.

In other words, when the commit server 130 receives the transaction pair from the matching server 120 and concludes the transaction pair, the commit server 130 records data, updated according to the result of the conclusion, in the database 150 via the cache server 140.

The commit server 130 may acquire user data for the conclusion of the transaction pair by requesting a lease on the user data from the cache server 140. Using the acquired user data, the commit server 130 may check whether a user corresponding to an order included in the transaction pair has a bank balance required for the processing of the order. By doing so, it may be possible to recheck the bank balance of the user which may have been changed after the checking of the admission server 110.

Furthermore, when it is determined that there is a bank balance, the commit server 130 returns the data, the lease of which has been requested, to the cache server 140, and may delete order information recorded on the order book of the user stored in the database 150 and change information about the bank balance via the cache server 140.

The commit server 130 may transfer conclusion information to the matching server 120 when the conclusion is successful.

The commit server 130 may receive a request for the conclusion of the transaction pair or respond while acknowledging the success of the conclusion through communication with the matching server 120. Through this, the matching server 120 may detect a failure of the commit server 130. For example, when the matching server 120 transfers a request for the conclusion of the transaction pair but does not receive an acknowledgment of the request, the matching server 120 may detect the occurrence of a failure in the commit server 130. When detecting the occurrence of a failure in the commit server 130, the matching server 120 may determine whether the processing of one or more unacknowledged orders has been completed on the database 150 by referring to the order book and the transaction history on the database 150, and may request another commit server to process the orders if the processing has not been completed.

The commit server 130 may communicate with the matching server 120 in an asynchronous manner, and may also be implemented as one or more instances. Accordingly, the commit server 130 may be scaled out while increasing the number of instances.

Meanwhile, the cache server 140 according to an embodiment is located between the admission server 110, the matching server 120, the commit server 130 or the stop order server 160, and the database 150, and prevents the admission server 110, the matching server 120, the commit server 130, or the stop order server 160 from directly accessing the database 150.

When receiving the request for user data, the cache server 140 may acquire the user data from the database 150 and cache the user data if it does not cache the user data.

When the admission server 110 or commit server 130 makes a request for recording or deletion on the order book or updates or requests user data, the cache server 140 may update the cached data or the data of the database 150.

The cache server 140 may manage the data incorporated into the database 150 by adding it to the transaction history. Preferably, the cache server 140 may manage the transaction history atomically with the data update.

The cache server 140 may receive a request for a lease on data. For example, the cache server 140 may receives a request for a lease from the admission server 110, the commit server 130, or the stop order server 160. However, the cache server 140 may receive a lock request for data.

The cache server 140 may manage the data the lease of which has been requested. Accordingly, when a failure occurs in the cache server 140, the admission server 110 checks whether data corresponding to the ID of the order is present in the order book, and the commit server 130 checks whether the order is present by referring to the transaction history. As the admission server 110 or commit server 130 makes a lease request again after the checking, the cache server 140 having recovered from the failure may operate in response to the request.

The cache server 140 may support sharding in order to eliminate a bottleneck phenomenon attributable to I/O.

Furthermore, the cache server 140 may operate in a write-through manner in order to prevent loss of data to be updated.

The database 150 according to one embodiment stores data required for the operation of the trading system 100.

For example, the database 150 may store user data. For example, the database 150 may store information about the balance of a user, the order book of the user, and the like.

Meanwhile, referring to FIG. 2, the trading system 100 according to one embodiment may further include the stop order server 160.

The stop order server 160 according to one embodiment may operate when an order requesting a 'stop transaction' is received.

When an order acquired by the admission server 110 is a 'stop transaction', the stop order server 160 may receive an order from the admission server 110.

The stop order server 160 may record the order in a database while storing the order.

Furthermore, when a condition for the processing of the order as a transaction is satisfied, the stop order server 160 may change the order to a 'specified price transaction' order or 'market price transaction' order, and may transmit the order to the admission server 110.

In other words, when the stop order server 160 obtains the order, it may acquire the user data of a user matching the order by requesting a lease on the user data from the cache server 140, and may check whether the user corresponding to the order has a bank balance for the processing of the order by using the acquired user data. When it is determined that the user has a bank balance, the stop order server 160 may determine that the order can be processed, may transmit a response to the admission server 110, and may record order information on the order book of the user stored in the database 150 while returning the data, the lease of which has been requested, to the cache server 140. Furthermore, the stop order server 160 may acquire conclusion information from the matching server 120, and may determine whether a specific condition is satisfied. When it is determined that a specific condition is satisfied, the stop order server 160 may change the "stop transaction" order to a "designated price transaction" or "market price transaction" order, and may transfer the changed order to the admission server 110.

The above-described stop order server 160 may be implemented as one or more instances. One of the one or more instances may be selected as a master, and may be allowed to receive an order from the admission server 110 and process the order.

Accordingly, one or more instances which are not selected as a master are set as slaves. In this case, when the master instance fails and cannot operate as the stop order server 160, one of the slave instances may become the master instance.

In this case, methods of selecting a master instance from among one or more instances may be various. In other words, a slave instance randomly selected from among slave instances may become a master instance, or an instance registered as the stop order server first among slave instances may become a master instance.

Each of the above-described admission server 110, matching server 120, commit server 130, cache server 140, and stop order server 160 may include a control unit (not shown), a communication unit (not shown), and memory (not shown).

The control unit controls the overall operation of the system, and may include a processor such as a CPU. For example, the control unit may execute a program stored in the memory, may read data stored in the memory, or may store new data in the memory.

The communication unit may perform wired or wireless communication with another system or a network. For this purpose, the communication unit may include a communication module which supports at least one of various wired/wireless communication methods. For example, the communication module may be implemented in the form of a chipset.

Wireless communication supported by the communication unit may be, e.g., Wireless Fidelity (Wi-Fi), Wi-Fi Direct, Bluetooth, Ultra Wide Band (UWB), or Near Field Communication (NFC). Furthermore, the wired communication supported by the communication unit 130 may be, e.g., Universal Serial Bus (USB) or High Definition Multimedia Interface (HDMI).

The communication unit (not shown) may perform remote procedure call (RPC) communication through a wired/wireless communication method, and RPC information may be stored in the coordination device 170. The coordination device 170 may acquire RPC information and generate an RPC channel upon registering a new server so that other servers in the system may recognize the registration of the new server and may determine that the server has a failure through the disconnection of the RPC channel.

Various types of data, such as a file, an application, a program, etc., may be installed and stored in the memory. The control unit may access and use data stored in the memory, or may store new data in the memory. Furthermore, the control unit may execute a program installed in the memory. For example, a program for performing a cryptocurrency trading method may be installed in the memory.

Meanwhile, the trading system 100 may further include a dashboard server (not shown) which may monitor the operation of the trading system 100.

Furthermore, the transaction system 100 may further include a management server (not shown) which manages the transaction system 100. The management server may process a management API. For example, the management server may control other servers upon performing an operation, such as the operation of stopping the operation of the trading system, the operation of adding a new currency, the operation of deleting an existing currency, the operation of adding an exchangeable target currency (the operation of adding the type of currency which can be used to purchase bitcoin when it is necessary to purchase bitcoin). Each of the dashboard server and the management server may communicate with other servers which constitute the system.

Figure 4:
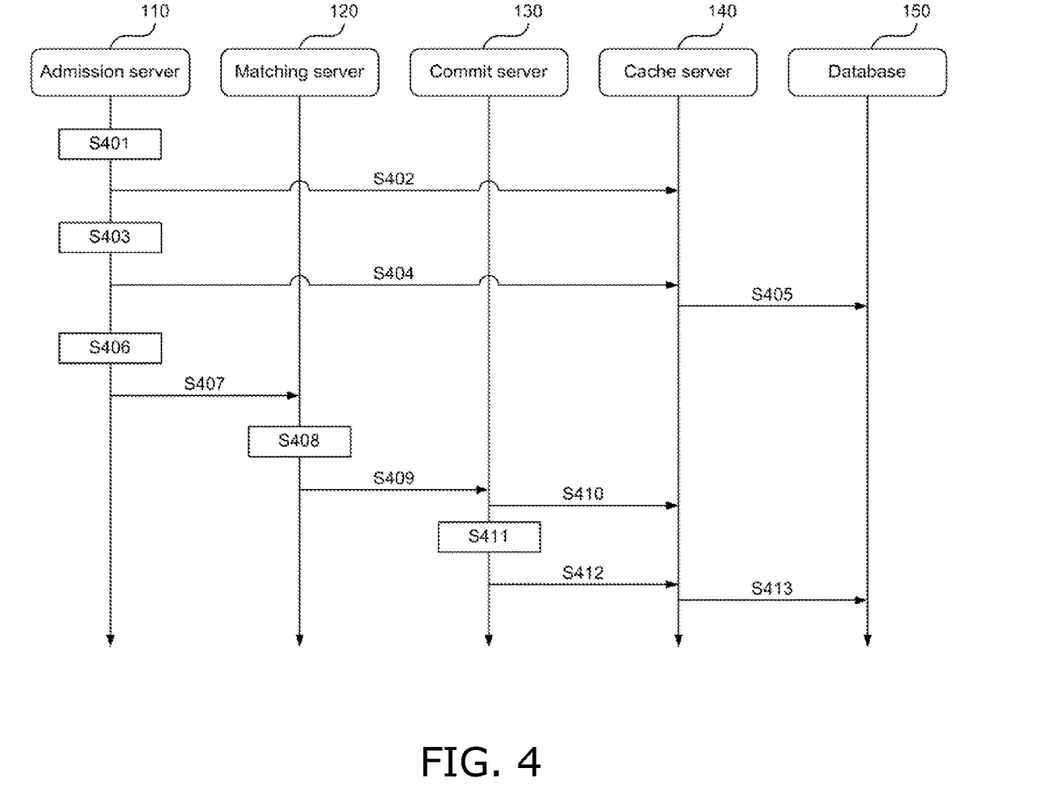
FIGS. 4 to 6 are flow diagrams illustrating cryptocurrency trading methods according to embodiments.
Figure 5:
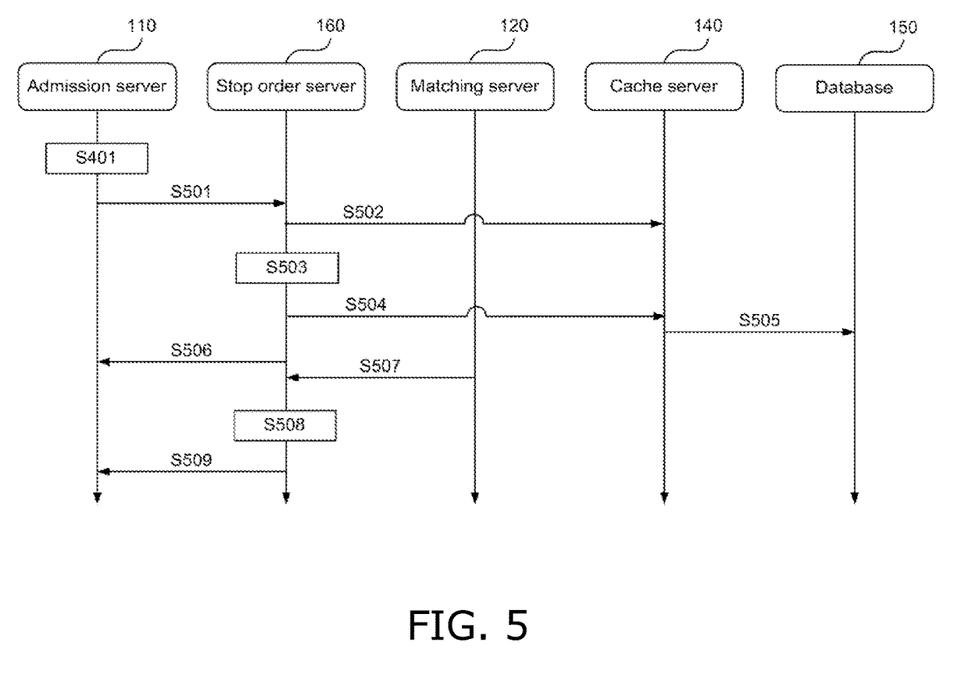
Figure 6:
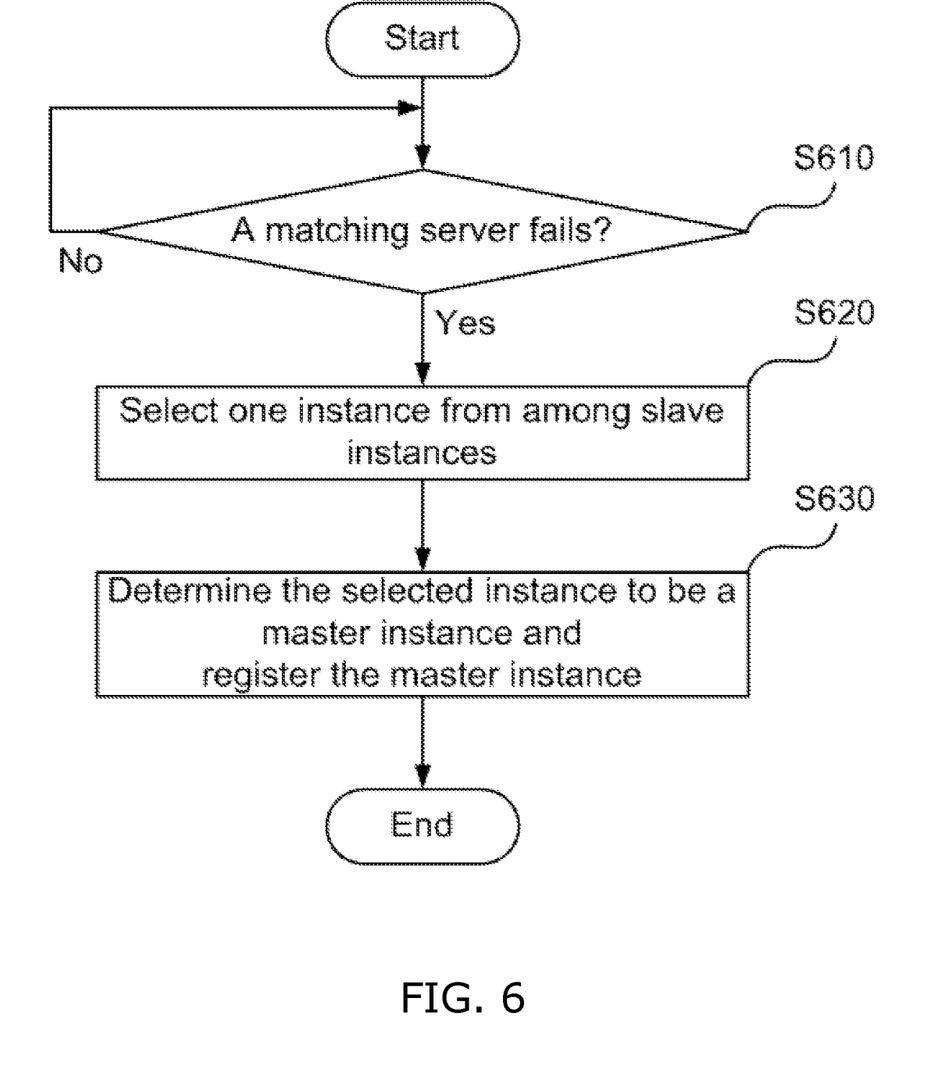

Meanwhile, FIGS. 4 to 6 are flow diagrams illustrating cryptocurrency trading methods according to embodiments.

Each of the cryptocurrency trading methods according to the embodiments shown in FIGS. 4 to 6 includes steps which are performed in a time-series manner in a corresponding one of the trading systems 100 shown in FIGS. 1 to 3. Accordingly, the descriptions which are omitted below but are given above in conjunction with the trading systems 100 shown in FIGS. 1 to 3 may be applied to the cryptocurrency trading methods according to the embodiments shown in FIGS. 4 to 6.

As shown in FIG. 4, the admission server 110 may acquire an order from an external system (not shown) and identify the type of order at step S401. At step S402, the admission server 110 having identified the type of order may request a lease of user data from the cache server 140 in order to check the balance of a user for the processing of the order when the order is a 'market price transaction' or 'designated price transaction'. When it is determined that the user has a balance and thus the order can be processed at step S403, the admission server 110 may also transmit information about the order while returning the data, the lease of which has been requested, to the cache server 140 at step S404. At step S405, the cache server 140 having received the order information may record the order on the order book of the user stored in the database 150 while updating the user data cached by itself. Thereafter, the admission server 110 may transfer a result value for the order to the external system at step S406. Accordingly, when a failure occurs in the admission server 110, the external system cannot acquire a result value for the order. Accordingly, the external system may detect the occurrence of a failure in the admission server 110, and may request the order again.

Thereafter, the admission server 110 may queue the order into the matching server 120 at S407. When a failure occurs in the admission server 110, the matching server 120 may detect the occurrence of the failure by means of RPC, and may read the order information stored in the database 150 and allow the order to be processed.

Meanwhile, the matching server 120 may generate a transaction pair by matching queued orders with each other at step S408, and may transfer the transaction pair to the commit server 130 at step S409. The commit server 130 may perform the conclusion of the transaction pair acquired from the matching server 120 and request a lease of user data from the cache server 140 for this purpose at step S410. When it is determined that the user has a balance for the processing of the transaction pair at step S411, the commit server 130 may update the user data by deleting the order information cached in the cache server 140 and also changing information on the balance while returning the data, the lease of which has been requested, to the cache server 140 at step S412. In addition, the cache server 140 may delete the order information recorded on the order book of the user stored in the database 150, update the user data, and add information about the processing of the transaction pair to a transaction history at step S413.

Meanwhile, in the case where the order is a "stop transaction" when the admission server 110 acquires the order from the external system at step S401, the individual steps of FIG. 5 are performed, and then the process may proceed to step S402 of FIG. 4.

In other words, the admission server 110 may transfer the order, which is a stop transaction, to the stop order server 160 at step S501. At step S502, the stop order server 160 having received the order may request a lease of user data from the cache server 140 in order to check the bank balance of the user for the processing of the order. When it is determined that the user has a bank balance and thus the order can be processed at step S503, the stop order server 160 may record the order in the database 150 via the cache server 140 (at step S504) at step S505. Furthermore, the stop order server 160 may transfer a response to the request for the order to the admission server 110 at step S506.

Thereafter, the stop order server 160 may receive conclusion information from the matching server 120 in real time at step S507. When it is determined based on the conclusion information that the specific condition of a stop transaction is satisfied at step S508, the stop transaction may be converted into at least one of a designated price transaction or a market price transaction and transmitted to the admission server 110 at step S509. The converted order is transferred to the admission server 110, and the trading system 100 may perform steps 402 to 413.

Meanwhile, the trading system 100 further includes the coordination device 170. When detecting a failure of the matching server 120, the trading system 100 allows the coordination device 170 to operate a new matching server 120, thereby accurately processing cryptocurrency transactions which need to be sequentially processed.

In other words, as shown in FIG. 6, the trading system 100 may run one or more slave instances. Therefore, when the trading system 100 detects a failure of the matching server at step S610, it may select one from among one or more slave instances at step S620. In this case, the selected instance may be an instance having requested registration first or an instance randomly selected. The trading system 100 may set the selected instance as a master instance and allow the selected instance to operate as a new matching server and may stop the operation of the existing failed master server at step S630.

When the new matching server is registered in the trading system 100, as described above, the newly registered matching server acquires a response to a conclusion request, previously made by the failed matching server, from the commit server 130, thereby determining that the processing of the conclusion request has been completed. Thereafter, the new matching server may recover one or more orders, which are queued by the failed matching server or for which a transaction pair is generated by the failed matching server, and which are not processed, from the database 150. While receiving a response to the conclusion request from the commit server 130 or recovering the orders from the database 150, the new matching server may set an order from the admission server 110 pending, and may queue the pending order after the recovery of the orders not processed by the failed matching server from the database has been completed.

The term "unit" used herein means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more CPUs in a device or secure multimedia card.

The cryptocurrency trading methods according to the embodiments described in conjunction with FIGS. 4 to 6 may be each implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the cryptocurrency trading methods according to the embodiments described in conjunction with FIGS. 4 to 6 may be each implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the cryptocurrency trading methods according to the embodiments described in conjunction with FIGS. 4 to 6 may be each implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended merely for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

According to at least one of the above-described embodiments, there are proposed the cryptocurrency trading system and method.

According to at least one of the above-described embodiments, there are proposed the cryptocurrency trading system and method which can increase the number of orders which can be processed per second, thereby efficiently processing orders.

According to at least one of the above-described embodiments, there are proposed the cryptocurrency trading system and method which can easily expand cryptocurrency trading service. In other words, even when the number of orders increases or the number of transactions increases due to the processing of orders, service can be expanded by the scale-out of the system.

According to at least one of the above-described embodiments, there are proposed the cryptocurrency trading system and method which can actively deal with failures which may occur in the trading system. Accordingly, when cryptocurrency trading service is provided, cryptocurrency can be traded without the interruption of the service.

According to at least one of the above-described embodiments, there are proposed the cryptocurrency trading system and method which can minimize the load which is imposed on a database. The admission server which constitutes a part of the trading system and acquires orders queues orders into the matching server which process orders, and thus the matching server does not need to fetch orders from the database, thereby minimizing the load which is imposed on the database.

According to at least one of the above-described embodiments, there are proposed the cryptocurrency trading system and method which enable user data to be securely used.

In other words, by requesting a lease of user data, data contention which may occur when the admission server or commit server uses the cache server can be prevented.

The effects which may be acquired by the disclosed embodiments are not limited to the above-described effects, and other effects which have not been described above will be clearly understood by those having ordinary knowledge in the art, to which the disclosed embodiments pertain, from the foregoing description.

The scope of the present invention should be defined by the attached claims, rather than the detailed description. Furthermore, all modifications and variations which can be derived from the meanings, scope and equivalents of the claims should be construed as falling within the scope of the present invention.

What is claimed is:

1. A cryptocurrency trading system comprising:
   an admission server configured to acquire orders requesting a cryptocurrency transaction from users;
   a first matching server configured to receive the orders transferred from the admission server and generate transaction pairs by matching the orders with each other, in order to process the orders;
   a coordination device configured to add the first matching server to the cryptocurrency trading system; and
   a commit server configured to receive a conclusion request for conclusion of the transaction pairs from the first matching server, conclude the transaction pairs and record data updated according to a result of the conclusion in a database,
   wherein the first matching server queues the orders received from the admission server,
   wherein when the first matching server fails, the coordination device registers a second matching server and allows the second matching server to process the orders,
   wherein the second matching server requests the commit server to conclude the transaction pairs that have been received from the first matching server but have not been concluded, and to respond to the second matching server, and recovers the orders queued by the first matching server from the database when acquiring a response to the conclusion request from the commit server, and
   wherein the second matching server sets the orders from the admission server pending, and queues the pending orders when the orders queued into the first matching server are recovered from the database.

2. The cryptocurrency trading system of claim 1, wherein the coordination device selects one of one or more slave instances as a master instance, and registers the second matching server corresponding to the master instance.

3. The cryptocurrency trading system of claim 2, wherein when the first matching server fails, the coordination device determines a first successfully registered one of the one or more slave instances to be the master instance.

4. The cryptocurrency trading system of claim 1, further comprising a stop order server configured to, when a condition corresponding to an order for a stop transaction is satisfied based on conclusion information received from the first matching server, convert the order for a stop transaction into at least one of an order for a designated price transaction and an order for a market price transaction;
   wherein the admission server identifies a type of acquired order, transfers the order to the stop order server when the type of order is a stop transaction, and acquires an order requesting at least one of a designated price transaction and a market price transaction from the stop order server.

5. The cryptocurrency trading system of claim 4, wherein when the stop order server fails, the coordination device selects one of one or more slave instances as a master instance, and registers a stop order server corresponding to the master instance as another stop order server.

6. The cryptocurrency trading system of claim 1, further comprising a cache server configured to receive a lease request for a lease of data for processing of the orders while communicating with the database configured to record orders.

7. A cryptocurrency trading method by which a cryptocurrency trading system, including an admission server configured to acquire orders requesting a cryptocurrency transaction from users, a first matching server configured to receive the orders transferred from the admission server, queue the orders received from the admission server and generate transaction pairs by matching the orders with each other, in order to process the orders, and a commit server configured to receive a conclusion request for conclusion of the transaction pairs from the first matching server, conclude the transaction pairs and record data updated according to a result of the conclusion in a database, trades cryptocurrency, the cryptocurrency trading method comprising:
   when the first matching server fails, registering a second matching server and allowing the second matching server to process the orders;
   by the second matching server, requests the commit server to conclude the transaction pairs that have been received from the first matching server but have not been concluded, and to respond to the second matching server, and acquiring a response to the conclusion request from the commit server;
   by the second matching server, recovering the orders queued by the first matching server, from the database; and
   by the second matching server, setting the orders from the admission server pending and queuing the pending orders when the orders queued into the first matching server are recovered from the database.

8. The cryptocurrency trading method of claim 7, wherein registering the second matching server and allowing the second matching server to process the orders comprises selecting one of one or more slave instances as a master instance and registering the second matching server corresponding to the master instance.

9. A computer-readable non-transitory storage medium having stored thereon a program which performs the method set forth in claim 7.

10. A computer program which is executed by a cryptocurrency trading system and which is stored in a non-transitory storage medium to perform the method set forth in claim 7.

* * * * *